United States Patent
Tseng

(10) Patent No.: US 12,411,576 B1
(45) Date of Patent: Sep. 9, 2025

(54) TOUCH PROCESSING DEVICE AND TOUCH PROCESSING METHOD

(71) Applicant: Wistron Corporation, New Taipei (TW)

(72) Inventor: Yao Shun Tseng, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 18/900,818

(22) Filed: Sep. 29, 2024

(30) Foreign Application Priority Data

Sep. 11, 2024 (TW) ................................. 113134402

(51) Int. Cl.
    *G06F 3/041* (2006.01)
(52) U.S. Cl.
    CPC ................................. *G06F 3/04166* (2019.05)
(58) Field of Classification Search
    None
    See application file for complete search history.

(56) References Cited

U.S. PATENT DOCUMENTS

| 9,075,474 | B2 | 7/2015 | Yang et al. |
| 2010/0134437 | A1 | 6/2010 | Yang et al. |
| 2010/0207894 | A1* | 8/2010 | Tsuei ...................... H04M 1/66 345/173 |
| 2011/0285646 | A1* | 11/2011 | Hsieh ................ G06F 3/041661 345/173 |
| 2018/0188950 | A1* | 7/2018 | Choi ................... G06F 3/04886 |

FOREIGN PATENT DOCUMENTS

| CN | 118012290 | 5/2024 |
| TW | 201020894 | 6/2010 |

* cited by examiner

*Primary Examiner* — Krishna P Neupane
(74) *Attorney, Agent, or Firm* — JCIPRNET

(57) ABSTRACT

A touch processing device and a touch processing method are provided. The touch processing device includes a processor, a touch controller, and a touch screen. The touch screen comprises a first touch area and a second touch area. The first touch area and the second touch area are divided based on a specific application. In response to the touch processing device accessing or executing the specific application, the processor controls the touch controller to perform touch sensing on the first touch area and disable the second touch area. In response to the touch processing device not accessing the specific application, the processor controls the touch controller to perform touch sensing on the first touch area and the second touch area.

8 Claims, 5 Drawing Sheets

TOUCH PROCESSING DEVICE AND TOUCH PROCESSING METHOD

CROSS-REFERENCE TO RELATED APPLICATION

This application claims the priority benefit of Taiwan application serial no. 113134402, filed on Sep. 11, 2024. The entirety of the above-mentioned patent application is hereby incorporated by reference herein and made a part of this specification.

BACKGROUND

Technical Field

The disclosure relates to an electronic device and a control technology thereof, and particularly relates to a touch processing device and a touch processing method.

Description of Related Art

Today's mobile electronic devices (such as smartphones, tablet computers, notebook computers, etc.) may be equipped with capacitive touch screens to allow users to input information conveniently. When a mobile electronic device is used, the display screen will display images normally and will also sense whether fingers or corresponding objects are in contact with the touch area at any time. Since mobile electronic devices have requirements for power consumption and standby time, if the power consumption of each component in the mobile electronic device may be saved, the overall standby time and battery lifetime of the mobile electronic device may be increased.

SUMMARY

The disclosure provides a touch processing device and a touch processing method, which save power consumption by disabling unused touch areas on a touch screen.

A touch processing device according to the embodiment of the disclosure includes a processor, a touch controller, and a touch screen. The touch controller is coupled to the processor. The touch screen is controlled by the touch controller. The touch screen includes a first touch area and a second touch area. The first touch area and the second touch area are divided based on a specific application. In response to the touch processing device accessing or executing the specific application, the processor controls the touch controller to perform touch sensing on the first touch area and disable the second touch area. Moreover, in response to the touch processing device not accessing the specific application, the processor controls the touch controller to perform touch sensing on the first touch area and the second touch area.

A touch processing method according to the embodiment of the disclosure is adapted for a touch processing device including a touch screen. The touch processing method includes: determining whether to access or execute a specific application, wherein the touch screen includes a first touch area and a second touch area, and the first touch area and the second touch area are divided based on the specific application; in response to accessing or executing the specific application, performing touch sensing on the first touch area in the touch screen and disabling the second touch area; and in response to not accessing the specific application, performing touch sensing on the first touch area and the second touch area.

Based on the above, the touch processing device and the touch processing method described in the embodiments of the disclosure maintain touch sensing in the touch area (referred to as the first touch area) on the touch screen that will be used for touch operations when accessing or executing the specific application (such as a text editing application, a messaging application, an input method keyboard application, etc.), and disable the touch area (referred to as the second touch area) that will not be used for touch operations. Moreover, the aforementioned specific application may also be to determine whether a touch sensing result is obtained for each touch detection area on the touch screen within a predetermined time period, thereby determining whether these touch detection areas maintain touch sensing. If a touch detection area obtains the touch sensing result within the predetermined time period, it may be determined that this single touch detection area will be used for touch operations and is set as the first touch area. Correspondingly, if a touch detection area does not obtain the touch sensing result within the predetermined time period, it may be determined that this single touch detection area will not be used for touch operations and is set as the second touch area. By disabling the second touch area during the specific application, part of the power consumption is saved and the power saving effect is achieved.

DESCRIPTION OF THE EMBODIMENTS

Figure 1:
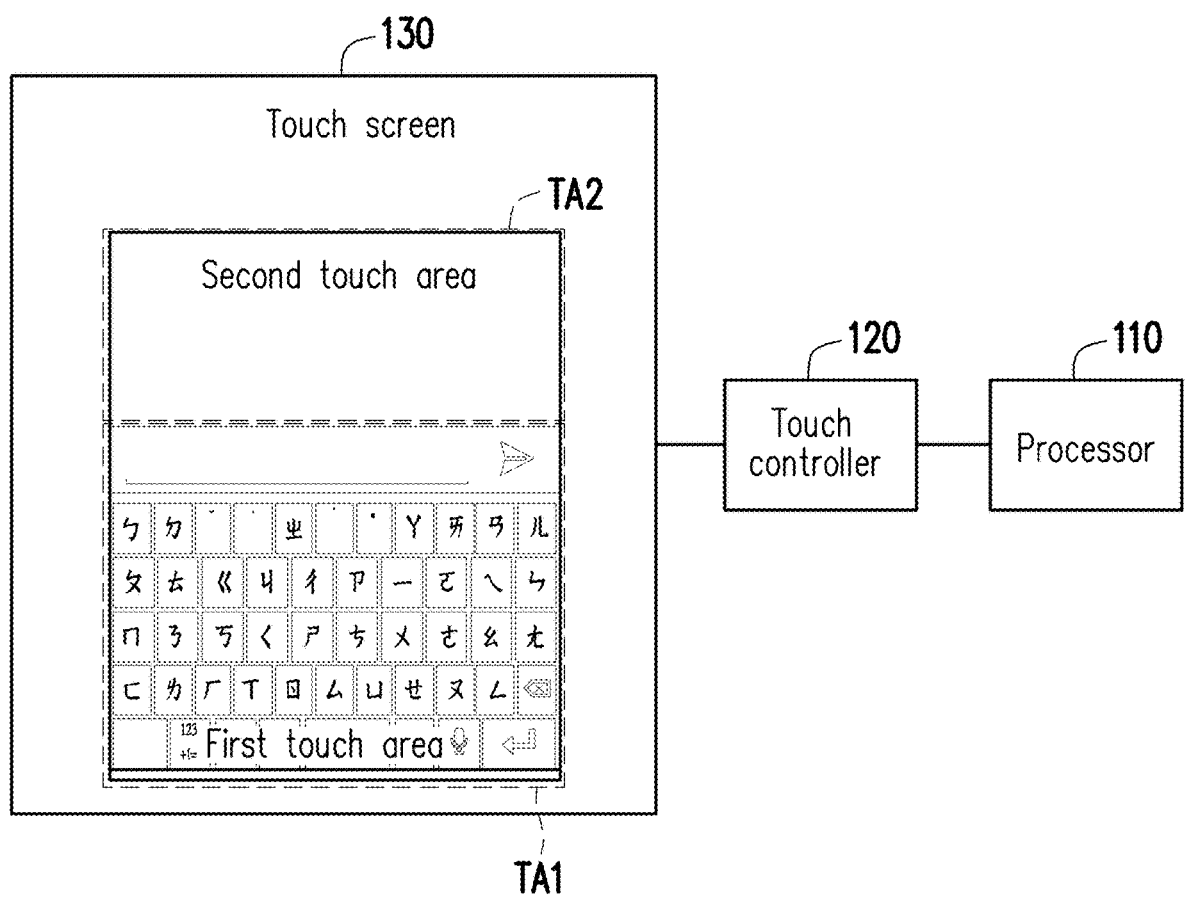
FIG. 1 is a schematic diagram of a touch processing device according to an embodiment of the disclosure.

FIG. 1 is a schematic diagram of a touch processing device according to an embodiment of the disclosure. The touch processing device may be disposed in an electronic device with a touch screen, such as a smartphone, a tablet computer, a notebook computer, etc. The touch processing device includes a processor 110, a touch controller 120, and a touch screen 130. The processor 110 may be a central processing unit (CPU), a microprocessor (MCU), a baseboard management controller (BMC), or a related processing component. The touch controller 120 may be a touch control chip used to control the touch screen 130. The touch screen 130 is controlled by the touch controller.

The touch screen 130 of FIG. 1 includes a first touch area TA1 and a second touch area TA2. The first touch area TA1 and the second touch area TA2 are divided based on a specific application. For example, the specific application presented on the touch screen 130 of FIG. 1 may be one of a text editing application, a messaging application, and an input method keyboard application.

In the aforementioned applications, the first touch area TA1 serves as the user's input interface, but the second touch area TA2 is not actually used as a touch interface. In other words, the second touch area TA2 does not use the touch sensing function in this specific application. Therefore, in the embodiment, when accessing or executing a relevant specific application, the first touch area TA1 may be allowed to maintain its own continuous touch sensing and the second touch area TA2 may be disabled, thereby saving power consumption.

Other embodiments consistent with the disclosure (e.g., FIG. 6) also illustrate other types of specific applications. For example, by determining whether a touch sensing result is obtained for each touch detection area on the touch screen within a predetermined time period, these touch detection areas are set as the first touch area TA1 or the second touch area TA1 to implement the embodiment.

Figure 2:
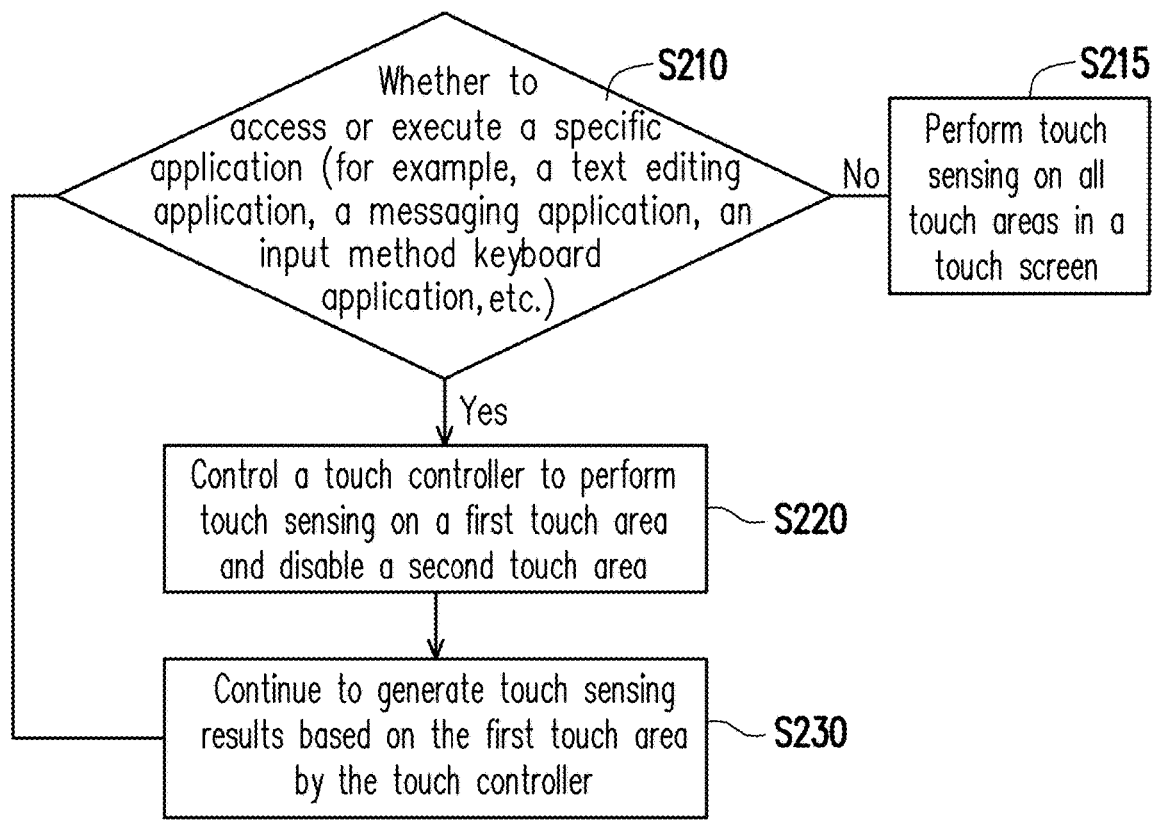
FIG. 2 is a flowchart of a touch processing method according to an embodiment of the disclosure.

FIG. 2 is a flowchart of a touch processing method according to an embodiment of the disclosure. The touch processing method of FIG. 2 is applicable to the touch processing device including the touch screen 130 of FIG. 1. Referring to FIG. 2, in step S210, the processor 110 determines whether to access or execute the specific application. The touch screen 130 includes the first touch area TA1 and the second touch area TA2. The first and second touch areas TA1 to TA2 are divided based on the specific application.

When step S210 is yes, that is, the specific application has been accessed or executed, step S220 is entered, and the processor 110 controls the touch controller 120 to perform touch sensing on the first touch area TA1 in the touch screen 130 and disable the second touch area TA2. In step S230, the touch controller 120 continues to generate touch sensing results based on the first touch area TA1 to the processor 110 to implement corresponding operations. In contrast, the disabled second touch area TA2 will not generate any touch sensing results. When the processor 110 exits or closes the specific application, the process returns to step S210 from step S230.

On the other hand, when step S210 is NO, that is, the specific application has not been accessed or executed, then step S215 is entered, and the processor 110 controls the touch controller 120 to perform touch sensing on all touch areas (i.e., the first touch area TA1 and the second touch area TA2) in the touch screen 130.

Figure 3:
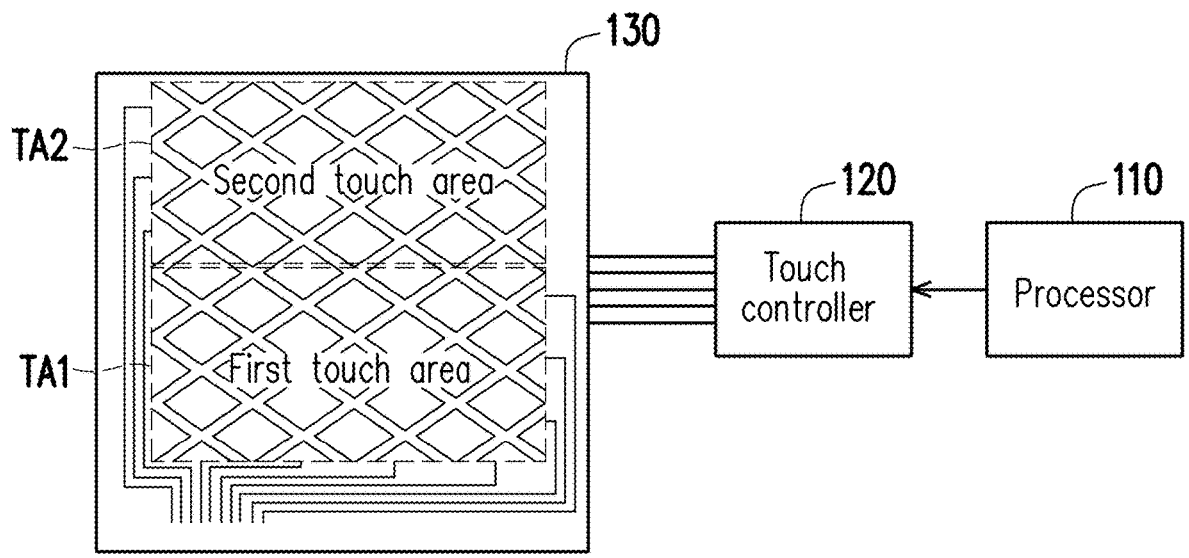
FIG. 3 is another schematic diagram of a touch processing device according to an embodiment of the disclosure.

FIG. 3 is another schematic diagram of a touch processing device according to an embodiment of the disclosure. The difference between FIG. 3 and FIG. 1 lies in that the touch screen 130 of FIG. 3 shows that it performs touch sensing through scanning lines in the X-axis direction (or horizontal direction). Therefore, the touch screen 130 of FIG. 3 may be divided into the first touch area TA1 and the second touch area TA2. Those who apply the embodiment may also change the direction of the touch sensing scanning lines of the touch screen 130 of FIG. 3 or partition the touch sensing scanning lines, so that the first touch area TA1 and the second touch area TA2 may be divided into more detailed or diversified ways. The touch screen 130 in the embodiment of the disclosure may be configured to have one or more first touch areas TA1 and one or more second touch areas TA2.

Figure 4:
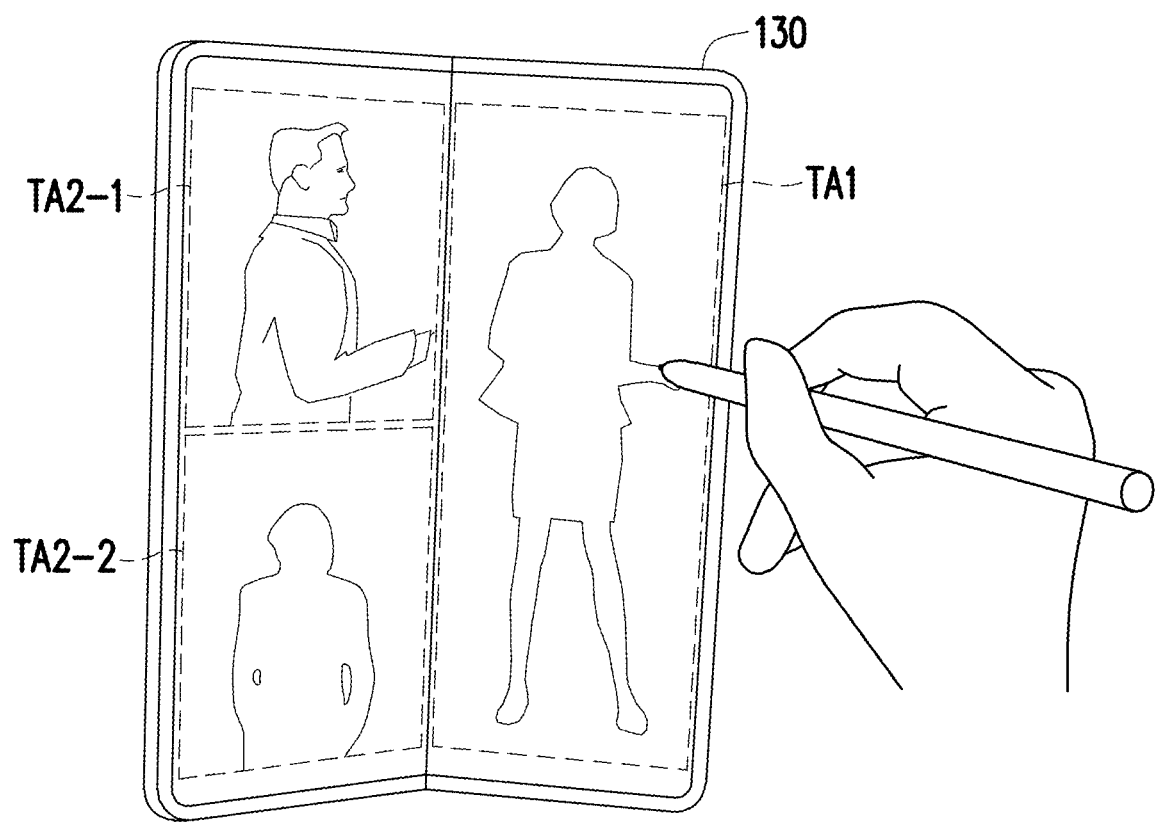
FIG. 4 is a schematic diagram of a touch processing device applied to a multi-screen electronic device according to an embodiment of the disclosure.

FIG. 4 is a schematic diagram of a touch processing device applied to a multi-screen electronic device according to an embodiment of the disclosure. The touch processing device of the embodiment may also be used in electronic devices with a plurality of screens. The touch screen in FIG. 4 includes a plurality of touch sub-screens, and these touch sub-screens may have set first touch areas (e.g., first touch area TA1) and second touch areas (e.g., second touch areas TA2-1 and TA2-2). The second touch areas TA2-1 and TA2-2 of FIG. 4 are used for browsing the screen, and the user may perform touch operations on the first touch area TA1 with a stylus pen.

Figure 5:
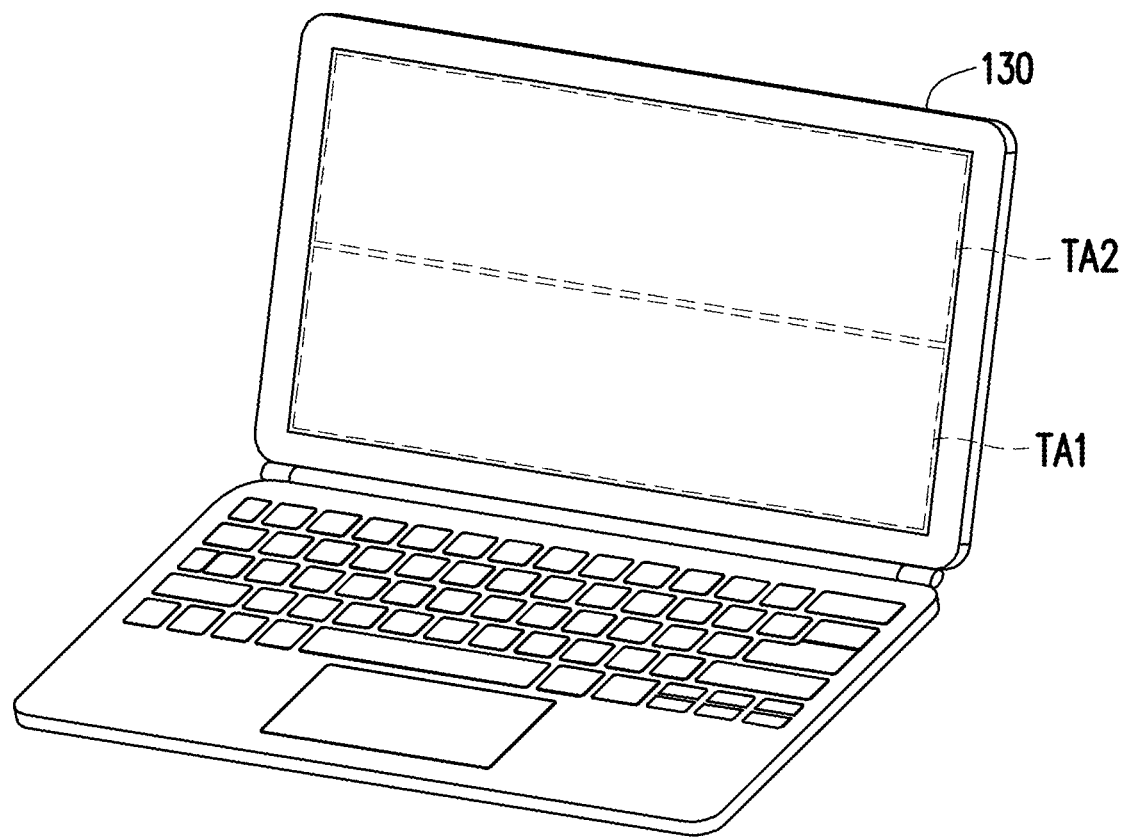
FIG. 5 is a schematic diagram of a touch processing device applied to a notebook computer according to an embodiment of the disclosure.

FIG. 5 is a schematic diagram of a touch processing device applied to a notebook computer according to an embodiment of the disclosure. When performing a large number of calculations (such as artificial intelligence calculations, graphic design calculations, etc.), the notebook computer will need to retain the computing power of the processor 110. Therefore, the embodiment disables a part of the touch area (e.g., the second touch area TA2) of the touch screen 130, which may slightly increase the computing power of the processor 110.

Figure 6:
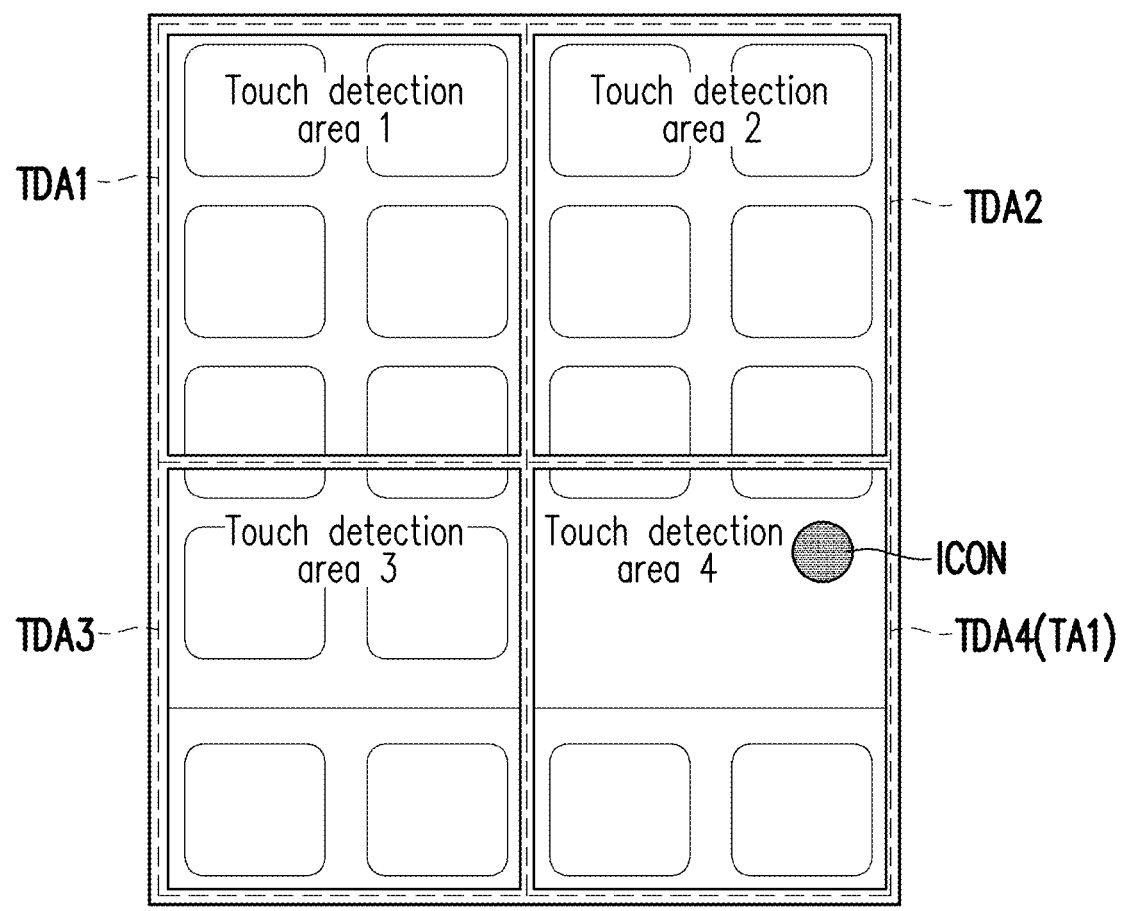
FIG. 6 is an exemplary schematic diagram of a touch processing device and a specific application according to an embodiment of the disclosure.

FIG. 6 is an exemplary schematic diagram of a touch processing device and a specific application according to an embodiment of the disclosure. The specific application of the embodiment may be to divide the Tu-6 touch screen into a plurality of touch detection areas (e.g., the four touch detection areas TDA1 to TDA4 shown in FIG. 6). The processor 110 of FIG. 1 controls the touch controller 120 to perform touch sensing on the touch detection areas TDA1 to TDA4 within a predetermined time period (for example, from a time point T1 to a time point TN), thereby obtaining the touch sensing result of each of the touch detection areas TDA1 to TDA4.

When a part of the touch detection areas (assumed to be the touch detection area TDA4 here) obtains the touch sensing result within the aforementioned predetermined time period, it means that the user has performed touch operations on the part of the touch detection areas with a finger or a stylus pen within the predetermined time period. Therefore, the part of the touch detection areas (the touch detection area TDA4) is set as the first touch area TA1.

On the other hand, when another part of the touch detection areas (assumed to be the touch detection areas TDA1 to TDA3 here) does not obtain the touch sensing result within the aforementioned predetermined time period, it means that the user has not performed touch operations on another part of the touch detection areas. Therefore, another part of the touch detection areas (the touch detection areas TDA1 to TDA3) is set as the second touch area TA2. In this way, the touch processing method of FIG. 2 may be implemented based on the specific application of FIG. 6.

The first touch area TDA4 (TA1) in the specific application of FIG. 6 includes a predetermined pattern ICON. Since the first touch area TDA4 (TA1) is still performing touch sensing, when it is detected that the predetermined pattern ICON is touched, the processor 110 of FIG. 1 will exit or stop executing this specific application and allow all touch areas in the touch screen to operate normally.

In summary, the touch processing device and the touch processing method described in the embodiments of the disclosure maintain touch sensing in the touch area (referred to as the first touch area) on the touch screen that will be used for touch operations when accessing or executing the specific application (such as a text editing application, a messaging application, an input method keyboard application, etc.), and disable the touch area (referred to as the second touch area) that will not be used for touch operations. Moreover, the aforementioned specific application may also be to determine whether a touch sensing result is obtained for each touch detection area on the touch screen within a predetermined time period, thereby determining whether these touch detection areas maintain touch sensing. If a touch detection area obtains the touch sensing result within the predetermined time period, it may be determined that this single touch detection area will be used for touch operations and is set as the first touch area. Correspondingly, if a touch detection area does not obtain the touch sensing result within the predetermined time period, it may be determined that this single touch detection area will not be used for touch operations and is set as the second touch area. By disabling the second touch area during the specific application, part of the power consumption is saved and the power saving effect is achieved.

Although the disclosure has been described with reference to the embodiments above, the embodiments are not intended to limit the disclosure. Any person skilled in the art can make some changes and modifications without departing from the spirit and scope of the disclosure. Therefore, the scope of the disclosure will be defined in the appended claims.

What is claimed is:

1. A touch processing device, comprising:
   a processor;
   a touch controller, coupled to the processor; and
   a touch screen, controlled by the touch controller, wherein the touch screen comprises a first touch area and a second touch area, and the first touch area and the second touch area are divided based on a specific application,
   wherein the specific application is set to divide the touch screen into a plurality of touch detection areas, and the touch controller performs touch sensing on the touch detection area within a predetermined time period to obtain a touch sensing result of each touch detection area,
   in response to a part of the touch detection area obtaining the touch sensing result within the predetermined time period, the part of the touch detection area is set as the first touch area, and
   in response to another part of the touch detection area not obtaining the touch sensing result within the predetermined time period, the another part of the touch detection area is set as the second touch area,
   wherein in response to the touch processing device accessing or executing the specific application, the processor controls the touch controller to perform touch sensing on the first touch area and disable the second touch area, and
   in response to the touch processing device not accessing the specific application, the processor controls the touch controller to perform touch sensing on the first touch area and the second touch area.

2. The touch processing device according to claim 1, wherein the specific application comprises one of a text editing application, a messaging application, and an input method keyboard application.

3. The touch processing device according to claim 1, wherein the touch screen comprises a plurality of touch sub-screens, and the first touch area and the second touch area are set to be located at a corresponding position of the touch sub-screen.

4. The touch processing device according to claim 1, wherein the first touch area in the specific application comprises a predetermined pattern,
   in response to detecting that the predetermined pattern is touched, the processor exits or stops executing the specific application and allows all touch areas in the touch screen to operate normally.

5. The touch processing device according to claim 1, wherein the touch controller is a touch control chip, and the processor is one of a central processing unit, a microprocessor, and a baseboard management controller.

6. A touch processing method, adapted for a touch processing device comprising a touch screen, the touch processing method comprising:
   determining whether to access or execute a specific application, wherein the touch screen comprises a first touch area and a second touch area, and the first touch area and the second touch area are divided based on a specific application,
   wherein the specific application is set to divide the touch screen into a plurality of touch detection areas, and a touch sensing is performed on the touch detection area within a predetermined time period to obtain a touch sensing result of each touch detection area,
   in response to a part of the touch detection area obtaining the touch sensing result within the predetermined time period, the part of the touch detection area is set as the first touch area, and
   in response to another part of the touch detection area not obtaining the touch sensing result within the predetermined time period, the another part of the touch detection area is set as the second touch area;
   in response to accessing or executing the specific application, performing touch sensing on the first touch area in the touch screen and disabling the second touch area; and
   in response to not accessing the specific application, performing touch sensing on the first touch area and the second touch area.

7. The touch processing method according to claim 6, wherein the specific application comprises one of a text editing application, a messaging application, and an input method keyboard application.

8. The touch processing method according to claim 6, wherein the first touch area in the specific application comprises a predetermined pattern,
   in response to detecting that the predetermined pattern is touched, the specific application is exited or stopped being executed, and all touch areas in the touch screen are allowed to operate normally.

* * * * *